UNITED STATES PATENT OFFICE.

EMILE AUGUSTIN BARBET, OF PARIS, FRANCE.

PROCESS FOR REMOVING TAR FROM PRODUCTS OF THE DISTILLATION OF WOOD OR COAL.

1,351,363.   Specification of Letters Patent.   Patented Aug. 31, 1920.

No Drawing.   Application filed November 6, 1918.  Serial No. 261,427.

*To all whom it may concern:*

Be it known that I, EMILE AUGUSTIN BARBET, citizen of the French Republic, residing at 5 Rue de l'Echelle Paris, France, have invented certain new and useful Processes for Removing Tar from Products of the Distillation of Wood or Coal, of which the following is a specification.

In my previous application for a patent filed October 14, 1918, Serial No. 258,111, I have described a process for removing the tar from pyrolignite solutions by using suitable solvents for tar, notably cresol.

My present invention consists of a process for removing the tar from the products of the distillation of wood or coal, while the tar is in the state of vapor, by effecting in determined conditions, preferably by a first treatment or preliminary removal of tar, by washing with tar itself, according to the known processes, and then a second removal of tar by means of phenolic oils such as those indicated in the application for a patent above referred to, and especially cresol (a higher phenol) although anthracene oils, the boiling point of which is higher than that of the cresols, may also be used.

When operating on products of the distillation of wood, the process will be the following:

The mixture of gas and of pyroligneous and tarry vapors issuing from the retorts is at a high temperature. A removal of a large part of the tar from the same may first be effected by bubbling through in tar itself as stated above.

When issuing from this tar removing apparatus, if the same is incased in a suitable jacket for avoiding loss of heat, the vapors will still be at a temperature of 115–130° C. From there the vapors are led to a second continuous tar removing apparatus superposed on the first one or arranged by the side of it (single or multiple bubbling apparatus), in which the vapors bubble through cresol or equivalent material; this apparatus is also surrounded by a suitable jacket for avoiding the loss of heat so that when the vapors issue their temperature is maintained not below 115° C.

At this temperature, the cresol is still far below its boiling point (about 200° C.), while the water vapor and acetic acid vapor being superheated, cannot be retained by the cresol. The tars only will dissolve therein. Consequently there will be obtained on the one hand vapors freed from tar, and on the other hand, at the base of the apparatus, cresol at 115–125° C., laden with the tars. This cresol will be treated for the separation of the tar from cresol, by fractional distillation, as mentioned in the application No. 258,111.

Instead of cresol, anthracene oils may be advantageously used, as they boil at a still higher temperature.

The same process may be used for completing the removal of tar from the gases and vapors from coke ovens. A bubbling through cresol or anthracene oil after a first removal of tar by the tar itself will be efficient; in certain cases, especially when the bubbling through oil is effected at a low temperature, a small quantity of benzol and of naphthalene may be retained. This does not cause any inconveniece; the subsequent distillation of the solvent for regenerating it will allow of recovering all the absorbed products.

What I claim is:

1. A process of removing the tar from the vapors and gases given off in the destructive distillation of wood or coal, which comprises bringing the said vapors into intimate and methodical contact with a phenolic solvent having a higher absorbing and dissolving power for tars than has tar itself, and afterward regenerating the solvent by distillation of the mixture of solvent and tar.

2. A process of removing tar from the gases and vapors given off in the destructive distillation of wood or coal, which comprises first submitting the gases and vapors to intimate contact with tar, and thereafter to intimate and methodical contact with a phenolic solvent having a higher absorbing and dissolving power for the tars than for the water and pyroligneous acid, and having a higher absorbing and dissolving power for tar than has tar itself, such operation being conducted at a temperature substantially above the boiling point of acetic acid, but substantially below that of the said solvent, and afterward regenerating the solvent by distillation.

3. In the process of removing tar from the vapors given off in the distillation of wood or coal, the step of bringing the said vapors into contact with cresol.

4. In the process of removing tar from the vapors given off in the distillation of wood or coal, the step of bringing the said vapors into intimate and methodical contact with cresol.

5. A process of removing tar from the vapors given off in the destructive distillation of wood or coal, which comprises bringing the said gases and vapors, first, into contact with tar for removal of a large amount of the tar content of the gases and vapors, and thereafter into intimate contact with cresol, and regenerating the cresol by distilling the same from the mixture thereof with tar produced in such second operation.

In testimony whereof I have signed my name to this specification in the presence of two subscribing witnesses.

EMILE AUGUSTIN BARBET.

Witnesses:
LUCIEN PAILLARD,
JOHN F. SIMONS.